Figure 1:
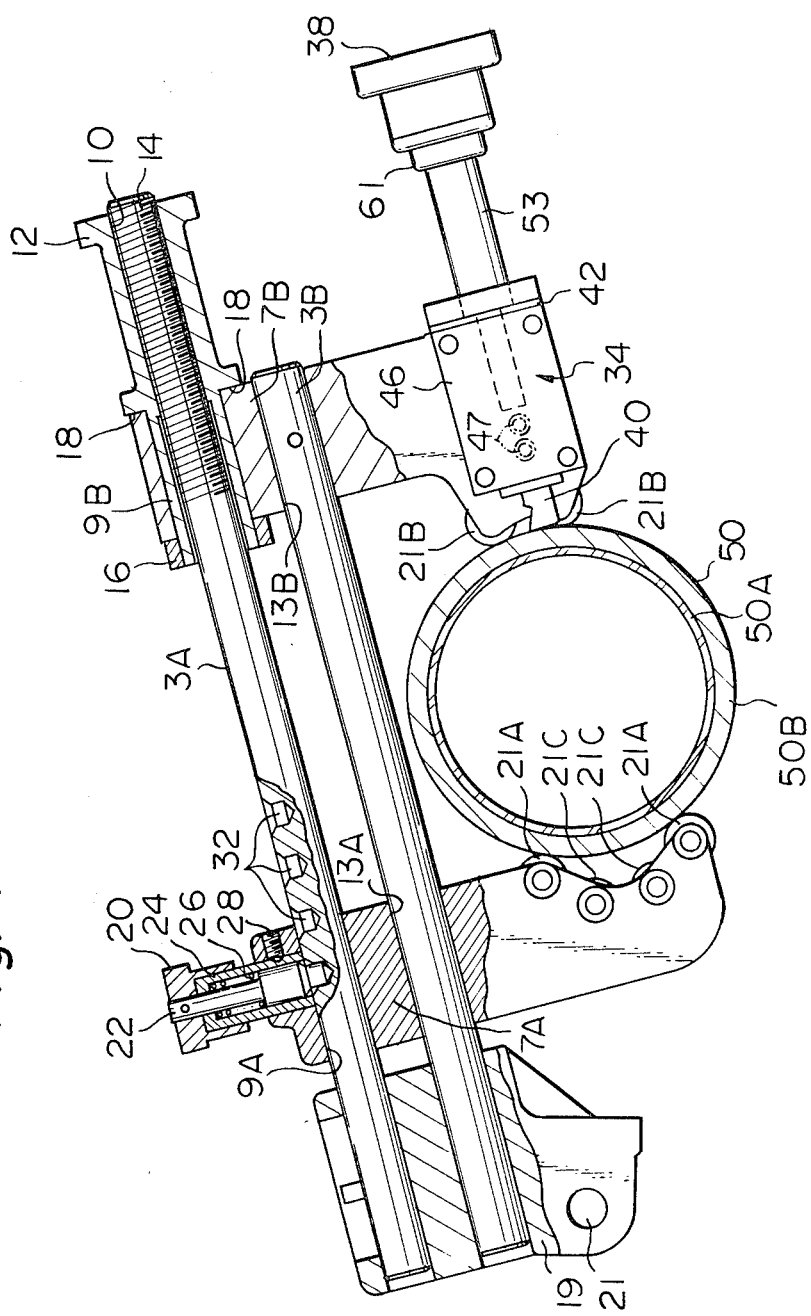

United States Patent [19]
Maruyama

[11] 4,443,943
[45] Apr. 24, 1984

[54] PIPE CUTTER

[75] Inventor: Masaaki Maruyama, Kyoto, Japan

[73] Assignee: Rex Industries Co., Ltd., Osaka, Japan

[21] Appl. No.: 343,171

[22] Filed: Jan. 27, 1982

[30] Foreign Application Priority Data

May 27, 1981 [JP] Japan ............................. 56-75798[U]

[51] Int. Cl.³ ............................................ B23D 21/06
[52] U.S. Cl. ...................................... 30/94; 91/177.4; 91/474
[58] Field of Search ............................. 30/94, 95, 101; 81/177.9, 474, 483, 480

[56] References Cited

U.S. PATENT DOCUMENTS

| 1,303,595 | 5/1919 | Rifflard | 81/483 |
| 4,268,959 | 5/1981 | Taira | 30/94 |

FOREIGN PATENT DOCUMENTS

| 877673 | 8/1971 | Canada | 81/474 |
| 5560918 | 4/1980 | Japan | |

Primary Examiner—E. R. Kazenske
Assistant Examiner—Douglas D. Watts
Attorney, Agent, or Firm—Merchant, Gould, Smith, Edell, Welter & Schmidt

[57] ABSTRACT

A pipe cutter comprising a guide member, a pair of supporting arms which are slidably arranged on the guide member, rotatable supporting rollers which hold a pipe to be cut on at least three points of the peripery thereof, a sliding member having a cutting tool fixed thereto, which is mounted on one of the supporting arms, and a feed screw shaft provided with a handle and screwed to the sliding member, wherein by turning the feed screw shaft, the sliding member and cutting tool can be moved in a predetermined direction, the improvement comprising a frictional clutch which is interposed between said handle and said feed screw shaft so that rotation of the handle is transmitted to the feed screw shaft only when the cutting resistance acting on the side of the feed screw shaft is smaller than a predetermined value.

7 Claims, 4 Drawing Figures

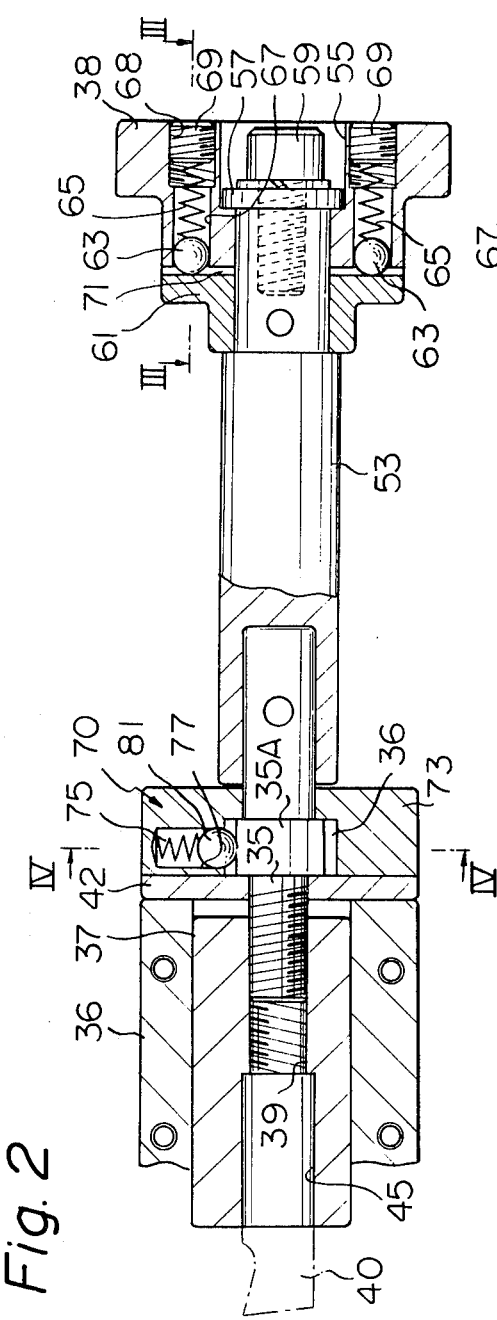
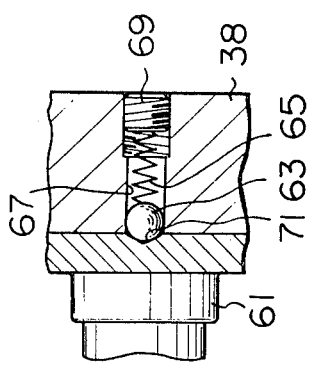
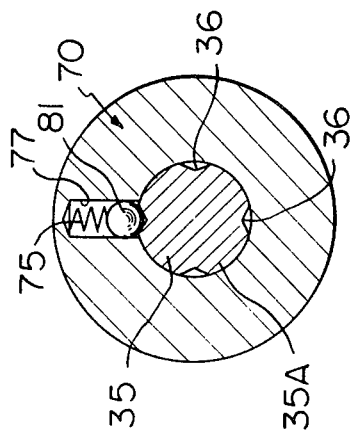
Fig. 2
Fig. 3
Fig. 4

PIPE CUTTER

The present invention relates to pipe cutter which is attached onto the periphery of a pipe to cut, form a groove on, or chamfer the pipe.

It is primary object of the present invention to provide a pipe cutter of a simple structure in which a cutting tool is used for obtaining an attractive right-angle cut surface.

Conventional cutting operations using grinders or roller blades present various problems when cutting widely-used plastic-lined steel pipes, for example, bad smells generated by burning plastic, broken plastic linings, and large warping of cut surfaces. Moreover, such cutting methods cannot practically be applied to cutting of pipes having large thicknesses. In a previous application assigned to the assignee of the present application, it was proposed to eliminate these problems through the use of a pipe cutter of a simple structure including a bitting tool type of cutting tool (Japanese Utility Model Application Laid-Open No. 55-60918).

In the pipe cutter disclosed in Japanese Utility Model Laid-Open No. 55-60918, however, the depth of cut of the cutting tool was determined by a simple manually turned knob, whereby it was difficult to obtain the identical depth of cut over several cutting operations. The depth of cut was increased exactly by the amount the knob was turned. In other words, the depth of cut of the cutting tool was directly proportional to how much the knob was turned, thereby varying depending on how much the knob was turned in different operations and making it impossible in practice to obtain a standard depth.

The present invention eliminates this problem. More specifically, in accordance with the present invention, there is provided an improved pipe cutter in which a frictional clutch is arranged on a handle (knob) to release the handle from its action on the cutting tool wherein the cutting resistance acting on the cutting tool rises above a predetermined valve, whereby the depth of cut effected by each individual cutting operation can be kept substantially constant.

The present invention will now be described in detail with reference to the accompanying drawings, in which FIG. 1 is a partially sectional front view of the pipe cutter according to the present invention, FIG. 2 is an enlarged sectional partial view illustrating the main parts of the pipe cutter shown in FIG. 1, FIG. 3 is a sectional plan view taken along the line III—III of FIG. 2, and FIG. 4 is an end view seen along the line IV—IV in FIG. 2.

A pair of supporting arms 7A and 7B are attached to a pair of parallel guide rods 3A and 3B which form a guide member. As described hereinafter, both the supporting arms 7A and 7B are arranged so that they can approach each other and separate from each other. In an embodiment illustrated in the drawings, the supporting arm 7B is secured to one end of the guide rod 3B and the other supporting arm 7A is movable along both the guide rods. Holes 9A and 9B and 13A and 13B are formed in the supporting arms 7A and 7B, respectively, so that the guide rods 3A and 3B are inserted through these holes.

A hollow sleeve-like adjusting knob 12 having an inner screw hole 10 is rotatably inserted in the hole 9B, and one end of the guide rod 3A is screwed to the inner screw portion 10 in the hollow bore of the adjusting knob 12. For this purpose, an outer screw portion 14 is formed on one end of the guide rod 3A. A ring member 16 is integrally secured to the top end of the adjusting knob 12. Accordingly, the upper portion of the supporting arm 7B is gripped between a shoulder 18 of the adjusting knob 12 and the ring member 16 without any gap so that the upper portion of the supporting member 7B can slide relatively to the shoulder 18 and the ring member 16. In the above-mentioned structure, when the adjusting knob 12 is turned, the supporting arm 7B is moved reciprocatively on the guide rod 3A relatively thereto in the axial direction.

A positioning knob 20 is mounted on the top end of the supporting arm 7A, and a positioning pin 22 is fixed to the positioning knob 20. The positioning knob 20 is slidably attached onto a hollow housing 24 secured to the top end of the supporting arm 7A by a fixing screw 28. A spring 26 is laid out in the hollow housing 24 to always press down the positioning pin 22 and, hence, the knob 20.

Positioning holes 32 are formed on the guide rod 3A according to the outer diameter of a pipe 50 to be cut, and the lower end of the positioning pin 22 is thrust into one of these holes 32. When the knob 20 is pulled up against the spring 26 and the pin 22 is taken out from the hole 32, the supporting arm 7A can be slid relatively to the guide rods 3A and 3B. An attaching arm 19 is disposed to attach the cutter of the present device to an appropriate cutting machine. For example, the cutter is attached to the cutting machine by inserting a pin (not shown) through a hole 21 of the attachment arm 19. Accordingly, when the pipe cutter is attached onto a pipe and the cutting operation is performed by the pipe cutter alone, the attaching arm 19 need not be disposed.

Rotary supporting rollers 21A and 21B forming a pipe holding member are rotatably attached to the lower end portions of the supporting arms 7A and 7B, respectively. Incidentally, a roller 21C is used instead of the roller 21A to hold the pipe 50 when the diameter of the pipe 50 is small.

A tool holder 34 is mounted on the lower portion of the supporting arm 7B. The tool holder 34 comprises a body 36 (see FIG. 2) secured to and held on the supporting arm 7B, and a sliding member 37 to which a cutting tool 40 is dismountably attached is slidably arranged in the body 36. Attachment of the cutting tool 40 is accomplished, for example, by fitting the tool 40 in a corresponding concave groove 45 formed on the sliding member 37 and pressing a shank portion of the tool 40 by the top end of a bolt 47 screwed from the top face of a pressing plate 46. The sliding member 37 has a female-screw hole 39, and a feed screw rod 35 is inserted into the female-screw hole 39 from the outside through an end plate 42.

In the conventional pipe cutter disclosed in Japanese Utility Model Application Laid-Open No. 55-60918, a knob was directly secured to the outer end of the above-mentioned feed screw rod 35. Turning the knob, and thereby the screw rod 35, one way and the other moved the sliding member 37 and, hence, the cutting tool 40 independently back and forth in the radial direction of the pipe 50. Accordingly, as pointed out hereinbefore, the depth of cut of the cutting tool 40 was increased exactly by the amount by which the knob was turned. The depth of cut changed every time the knob was turned and could not be kept constant. The reason is that the amount by which the knob was turned was determined by operator intuition. The present invention solves this problem by providing a mechanism which allows the cutting tool to make a predetermined depth of cut irrespective of the amount the knob is turned.

According to the present invention, a rod 53 is integrally secured to the outer end of the screw rod 35 (this rod is not an indispensable member), and a handle (knob) 38 is relatively rotatably attached to the outer end of the rod 53. Attachment of the handle 38 to the rod 53 is accomplished by inserting bolt 59 into the rod 53 through a washer 57 in a concave portion 55 of the handle 38. Accordingly, the handle 38 is capable of slip rotation in the boundary face to the washer 57. Through holes 67 are formed in the handle 38, for example, at two positions confronting each other with respect to the direction of the diameter or more positions. Balls 63 and springs 65 forming the frictional clutch of the present invention are arranged in these through holes 67. A screw hole 68 is formed on the outer end of each hole 67, and a small screw 69 is inserted in the screw hole 68 to anchor the spring 65. A clutch member (disc) 61 having a V-groove 71 is secured to the rod 53 at a position confronting the hndle 38, and a part of the ball 63 is intruded in the V-groove 71. Namely, the ball 63 is always pressed to the V-groove 71 by the spring 65. Accordingly, if a load (cutting resistance) larger than a predetermined value does not act on the side of the rod 53, rotation of the handle 38 is transmitted to the clutch member 61 through the frictional clutch constructed by the ball 63 and the V-groove 71. In this case, by turning the handle 38, the cutting tool 40 is advanced in the radial direction through the feed screw rod 35. On the contrary, if a large load acts on the side of the rod 53, even if the handle 38 is turned, the handle 38 merely runs idle on the clutch member 61. Namely, the ball 63 rides over the V-groove 71. The critical value of the cutting resistance at which the handle 38 begins to run idle is optionally set according to the load of the spring 65.

In the above-mentioned structure, if the handle 38 is turned by a large quantity to increase the feed quantity of the cutting tool 40, since the cutting resistance is proportionally increased, the resisting force acting on the side of the clutch member 61 is similarly increased to cause the handle 38 to run idle. Therefore, according to the present invention even if the handle 38 is inadvertently turned by a large amount, when the cutting resistance of the cutting tool exceeds the predetermined value, the handle 38 is caused to run idle, whereby the feed quantity (depth of cut) of the cutting tool is always kept constant.

In the case where a workpiece is a material in which the cutting resistance changes midway, such as a pipe 50 comprising a steel pipe 50B and a plastic layer 50A formed on its inner circumference (or the periphery) as shown in FIG. 1, the load of the spring 65 is set, for example, based on the cutting resistance of the steel pipe 50B. Accordingly, when starting to cut the plastic layer 50A, the operator encounters far smaller cutting resistance, whereby he may turn the handle 38 by large amounts whithout idling the handle 38. Namely, when starting to cut the plastic layer 50A after completion of cutting the steel pipe 50B, there is a possibility that he might cut a large quantity of the plastic layer 50B by turning the handle 38. In order to prevent the occurrence of this undesirable phenomenon, it is preferred that a notch mechanism 70 be mounted on the feed screw rod 35. This notch mechanism is useful particularly when the cutting resistance is reduced. For example, this notch mechanism comprises four V-grooves 36 formed at intervals of 90° on the periphery of a boss portion 35A of the feed screw rod 35 and one ball 81 pressed into one of the V-grooves 36. The ball 81 is arranged, together with a spring 75, in a blind hole 77 of a housing 73 relatively rotatably attached to the feed screw rod 35, and the supporting member 70 is fixed to an end plate 42. Every 90° turn of handle 38, that is, every 90° turn of the feed screw rod 35 pushes the ball 81 into the V-groove 36 with a snap which can be felt by the hand of the operator. If this arrangement is adopted, the operator can make exactly 90° turns of the handle even in the dark or even without visual confirmation of the turning angle, thereby preventing excessive turning of the handle. That is, excessive feed of the cutting tool is avoided. Increasing the number of V-grooves 36 can enable finer control of the feeding of the cutting tool.

The pipe cutter having the above-mentioned structure is attached to the pipe 50 in the following manner. At first, the knob 12 is turned to move the supporting arm 7B to the right end position. At this time, the cutting tool 40 is located at the retreated position. Then, the pipe cutter 50 is attached onto the pipe 50. The hole 32 of the guide rod 3A is set, in advance according to the standard outer diameter size of the pipe 50.

The knob 20 is pulled up and the pin 22 is withdrawn from the hole 32, and the supporting arm 7A is moved along the guide rods 3A and 3B and the pin 22 is engaged with the hole 32 set according to the outer diameter of the pipe 50 to set the supporting arm 7A.

Then, the knob 12 is turned in the direction opposite to the above-mentioned turning direction to bring the supporting arm 7B close to the supporting arm 7A, and the pipe 50 is secured assuredly by four supporting rollers 21A and 21B.

Finally, the handle 38 is turned to bring the blade edge of the cutting tool 40 into abutting contact with the periphery of the pipe 50, and then, the pipe 50 is driven and rotated by a driving member (not shown). The cutting tool 40 is advanced several times according to the thickness of the pipe 50 by the handle 38 until cutting of the pipe 40 is completed. At this time, according to the present invention the feed quantity of the cutting tool is kept constant as described hereinbefore.

It is sufficient if the pipe 50 is held on at least three points on the periphery thereof. Accordingly, two rotatable supporting rollers of one of the supporting arms 7A and 7B may be substituted by a single roller. In this case, the single roller should be arranged at the center between the two rollers shown in the drawings.

The frictional clutch means is not limited to the mechanism illustrated in the drawings, and there may be adopted other modifications. For example, engaging wave forms may be formed on the confronting surfaces of the handle 38 and clutch member 61, or frictional members may be bonded to the confronting surfaces of the handle 38 and clutch member 61.

The V-grooves 36 and 71 may be arcuate grooves or may have another shape.

According to the present invention since a cutting tool can be used as the cutting means, a good-finish cut surface at right angles to the axial line of the pipe can be obtained.

Furthermore, in the present invention, since the feed quantity of the cutting tool is always kept constant, breakage or wearing of the cutting tool can be reduced.

Moreover, if the shape of the cutting tool is appropriately changed, not only the cutting operation but other processing such as grooving or chamfering can be accomplished according to the present invention.

I claim:

1. A pipe cutter comprising: a guide member; a pair of supporting arms which are arranged on the guide member so that they can approach each other and separate from each other; pipe holding members provided with rotatable supporting rollers, which are arranged on said supporting arms to confront each other so that a pipe to be cut is held on at least three points of the periphery thereof between the pipe holding members; a sliding member having a cutting tool fixed thereto, which is mounted on at least one of the pipe holding members so that the sliding member can move in the radial direction of the pipe to be cut; a handle; a feed screw shaft attached between said handle and said sliding member and screwed to said sliding member, wherein by turning the feed screw shaft by means of the handle, the sliding member and cutting tool can be moved in a direction toward said pipe; and clutch means for disengageably engaging said handle and said feed screw shaft so that rotation of the handle is transmitted to the screw shaft only when the cutting resistance acting on the side of the feed screw shaft is smaller than a predetermined value, said clutch means including a first clutch member which is connected to the feed screw shaft and which is frictionally engaged by the handle, said clutch means further including a plurality of balls and individual biasing means associated with each of said balls for biasing each of said balls into frictional engagement between said first clutch member and said handle.

2. A pipe cutter according to claim 1, wherein said clutch member includes at least one V-shaped groove and wherein said handle holds the biased balls partially fitted in the V-shaped groove.

3. A pipe cutter according to claim 1, further comprising a notch means on the feed screw shaft for producing a signal which represents the feed of the cutting tool.

4. A pipe cutter according to claim 3, wherein said notch means comprising equi-angularly spaced grooves provided on the feed screw shaft and a housing which is immovably connected to one of the supporting arms and which has springy biased balls which are intermittently engaged in the corresponding grooves on the feed screw shaft.

5. A pipe cutter according to claim 3, wherein said notch means produces audible signals.

6. A pipe cutter according to claim 3, wherein said notch means produces physical signals.

7. A pipe cutter, comprising: a guide member; a pair of supporting arms which are arranged on the guide member so that they can approach each other and separate from each other; pipe holding members provided with rotatable supporting rollers, which are arranged on said supporting arms to confront each other so that a pipe to be cut is held on at least three points of the periphery thereof between the pipe holding members; a sliding member having a cutting tool fixed thereto, which is mounted on at least one of the pipe holding members so that the sliding member can move in the radial direction of the pipe to be cut; a handle; a feed screw shaft attached between said handle and said sliding member and screwed to said sliding member, wherein by turning the feed screw shaft by means of the handle, the sliding member and cutting tool can be moved in a direction toward said pipe; and clutch means for disengageably engaging said handle and said feed screw shaft so that rotation of the handle is transmitted to the screw shaft only when the cutting resistance acting on the side of the feed screw shaft is smaller than a predetermined value, said clutch means including first and second spaced apart clutch members attached to said feed screw shaft, said handle including a portion retained between said first and second clutch members, said clutch means further including a plurality of balls and individual biasing means associated with each of said balls between said handle and recesses in one of said clutch members, said clutch means also including means for adjusting each of said biasing means.

* * * * *